AUTOMATIC CHARACTER RECOGNITION APPARATUS

Filed Aug. 23, 1966 7 Sheets-Sheet 1

INVENTORS
KAZUO KIJI
YUKIO HOSHINO
BY
OSTROLENK, FABER, GERB & SOFFEN
ATTORNEYS

INVENTORS
KAZUO KIJI
YUKIO HOSHINO
BY
OSTROLENK, FABER, GERB & SOFFEN
ATTORNEYS

INVENTORS
KAZUO KIJI
YUKIO HOSHINO
BY
OSTROLENK, FABER, GERB & SOFFEN
ATTORNEYS

INVENTORS
KAZUO KIJI
YUKIO HOSHINO
BY
OSTROLENK, FABER, GERB & SOFFEN
ATTORNEYS

Aug. 4, 1970 KAZUO KIJI ET AL 3,522,586

AUTOMATIC CHARACTER RECOGNITION APPARATUS

Filed Aug. 23, 1966 7 Sheets-Sheet 5

FIG. 13.
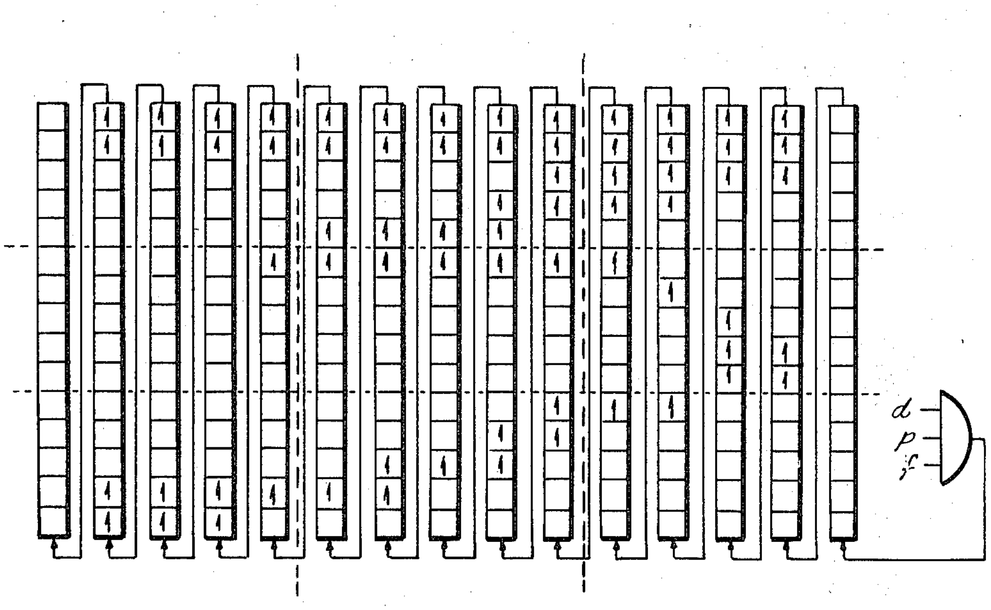
FIG. 15.
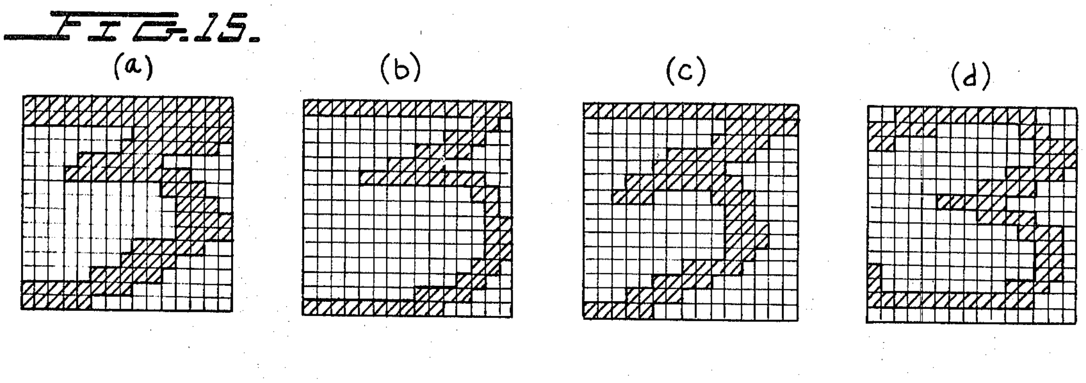
FIG. 19.
| PAT-TERN | m=1 | | | | m=2 | | | | m=3 | | | | m=4 | | | |
|---|---|---|---|---|---|---|---|---|---|---|---|---|---|---|---|---|
| | NW1 | N1 | NE1 | E1 | NW2 | N2 | NE2 | E2 | NW3 | N3 | NE3 | E3 | NW4 | N4 | NE4 | E4 |
| 15a | 0 | 0 | 0 | 1 | 1 | 1 | 1 | 1 | 1 | 1 | 1 | 1 | 0 | 0 | 0 | 0 |
| 15b | 0 | 0 | 0 | 1 | 0 | 0 | 1 | 1 | 0 | 0 | 1 | 1 | 0 | 0 | 0 | 0 |
| 15c | 0 | 0 | 0 | 1 | 0 | 1 | 1 | 1 | 0 | 1 | 1 | 1 | 0 | 0 | 0 | 0 |
| 15d | 0 | 0 | 0 | 1 | 0 | 0 | 0 | 1 | 1 | 0 | 0 | 1 | 0 | 0 | 0 | 0 |
| | 0 | 0 | 0 | 1 | | | | 1 | | | | 1 | 0 | 0 | 0 | 0 |
| PAT-TERN | m=5 | | | | m=6 | | | | m=7 | | | | m=8 | | | | m=9 | | | |
|---|---|---|---|---|---|---|---|---|---|---|---|---|---|---|---|---|---|---|---|---|
| | NW5 | N5 | NE5 | E5 | NW6 | N6 | NE6 | E6 | NW7 | N7 | NE7 | E7 | NW8 | N8 | NE8 | E8 | NW9 | N9 | NE9 | E9 |
| 15a | 0 | 0 | 0 | 1 | 1 | 1 | 1 | 1 | 0 | 0 | 0 | 1 | 0 | 0 | 1 | 1 | 0 | 0 | 0 | 0 |
| 15b | 0 | 0 | 0 | 1 | 0 | 1 | 0 | 0 | 0 | 0 | 0 | 1 | 0 | 0 | 0 | 1 | 0 | 0 | 1 | 0 |
| 15c | 0 | 0 | 0 | 1 | 1 | 1 | 0 | 1 | 0 | 0 | 0 | 1 | 0 | 0 | 1 | 1 | 0 | 0 | 0 | 0 |
| 15d | 0 | 0 | 0 | 1 | 1 | 0 | 0 | 1 | 0 | 0 | 0 | 0 | 0 | 0 | 0 | 1 | 0 | 1 | 0 | 0 |
| | 0 | 0 | 0 | 1 | | | | | 0 | 0 | 0 | | 0 | 0 | | 1 | 0 | | | 0 |
INVENTORS
KAZUO KIJI
YUKIO HOSHINO
BY
OSTROLENK, FABER, GERB & SOFFEN
ATTORNEYS

AUTOMATIC CHARACTER RECOGNITION APPARATUS

Filed Aug. 23, 1966 7 Sheets-Sheet 7

INVENTORS
KAZUO KIJI
YUKIO HOSHINO
BY
OSTROLENK, FABER, GERB & SOFFEN
ATTORNEYS 3,522,586

AUTOMATIC CHARACTER RECOGNITION APPARATUS

Kazuo Kiji and Yukio Hoshino, Tokyo-to, Japan, assignors to Nippon Electric Company Limited, Tokyo, Japan Filed Aug. 23, 1966, Ser. No. 574,354
Claims priority, application Japan, Aug. 25, 1965, 40/51,785
Int. Cl. G06k *9/12*
U.S. Cl. 340—146.3 3 Claims

ABSTRACT OF THE DISCLOSURE

A character recognition system for recognizing characters of various types of fonts. The region occupied by a character is divided up into a 15 x 15 matrix of equal sized elemental areas. Each of the elemental areas is scanned to determine "blackness" or "whiteness." Immediately adjacent 3 x 3 elemental area groups are examined to determine the presence of predetermined spot-features. The 15 x 15 matrix of elemental areas is divided in 9 subregions each containing a 5 x 5 matrix group of elemental areas in which the total number of spot-features present are determined. The number of spot-features present in each 5 x 5 elemental area matrix are counted to ascertain whether a predetermined threshold number of predetermined spot-features are present. The number of spot-features per 5 x 5 submatrix are determined as to whether the threshold level for each submatrix is or is not exceeded. The submatrices which achieve the threshold level are compared against stored information for those characters in which the threshold levels are achieved to display or print-out that character which has been scanned.

The instant invention relates to character recognition devices and more particularly to a new and improved character recognition apparatus adapted to identify printed or handwritten characters and which is provided with performance characteristics equivalent to conventional apparatus of this general category while at the same time providing a very substantial reduction in logical circuits, thereby greatly simplifying the overall structure.

It has been common practice in the present day character recognition field to identify characters by utilizing reference characters and resorting to optical, electrical, or some other matching means. An alternative means that has been adopted is that of extracting some features of a character to be recognized and to detect whether or not these features coincide with those of a corresponding reference character.

To recognize characters in various fonts, the former character recognition method requires the preparation and storage of a large number of reference characters, thereby resulting in bulky and expensive apparatus. Therefore, constructing an apparatus capable of recognizing both printed and typewritten characters in various types of fonts as well as handwritten characters would require apparatus which is extraordinarily expensive due to the number of reference characters which are required to be stored thereby making the circuitry for storing information on the reference characters extremely complex and bulky. In other words, the former recognition method invariably imposes a restriction on the number of fonts which may be examined by the character recognition apparatus.

In contrast, while it is true that in reducing the latter recognition method to practice, the storage of information on the features of reference characters effective for recognition in the form of a relatively small number of digital quantities as opposed to a relatively large number is all that is needed, it is likewise true that the device for extracting information on the features of characters effective for recognition still nevertheless becomes quite bulky and complex, thereby making apparatus cost considerably tedious and expensive.

Accordingly, a principal object of the instant invention is to provide a new automatic character recognition apparatus which is vastly simpler and much less expensive than conventional designs, while at the same time yielding comparable performance as compared with conventional devices by means of incorporating as simple a character feature detection system as is possible on the basis of the inventors' finding as a result of vast experimentation which has yielded the fact that significant features of characters, notably those of arabic numerals, may be successfully abstracted and these characters may be identified by dividing the area covered by a character into a plurality of blocks wherein fewer block numbers than conventional devices are required, namely, the device of the instant invention reduces the area covered by a character to a 3 x 3 array of blocks.

The features and advantages of the character-features detection system of the instant invention may be summarized as follows:

(1) While a character to be recognized is scanned, the features of a matrix of 3 x 3 elemental areas throughout the central spot being scanned are detected from one central spot to another sequentially and at the same time, all of the features of a plurality of blocks (fewer than the total number of elemental areas) covered by the character are detected simultaneously for the purpose of matching between the block features of the character and the prearranged block features of a reference character.

As will be evident to those with ordinary skill in the art, the above mentioned merit of the character-features detecting system readily anticipates the following additional merits:

(2) No particular circuit or process is involved for normalizing the vertical and horizontal position of a character to be recognized before extracting the character features as is required in many conventional recognition methods.

(3) Character features necessary for recognition can be extracted without resorting to the so-called "thinning" process that has been commonly used with conventional recognition methods for ease and security of detection despite changes in geometry, stroke widths, or possible distortions and displacements of multi-font printed or handwritten characters.

It is therefore one primary object of the instant invention to provide a novel character recognition method and apparatus comprised of means for storing a minimum amount of characteristic features of each character to be detected, means for scanning the character being detected and means for comparing features of the character being detected against those features previously stored for the purpose of rapidly and reliably identifying the character. These and other objects of the instant invention will become apparent when reading the accompanying description and drawings in which.

Figure 4A:
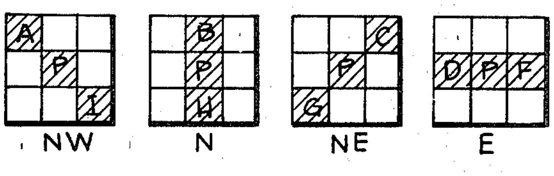
Figure 4B:
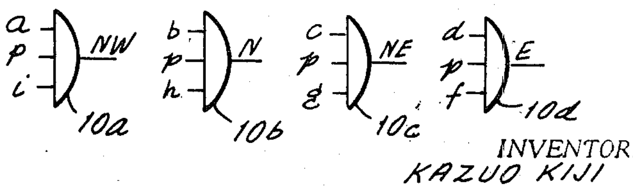

FIGS. 4*a* and 4*b* respectively, illustrate typical matrix patterns depicting spot features of a character being scanned and a set of logic circuits for detecting the spot features of the character.

Figure 5:
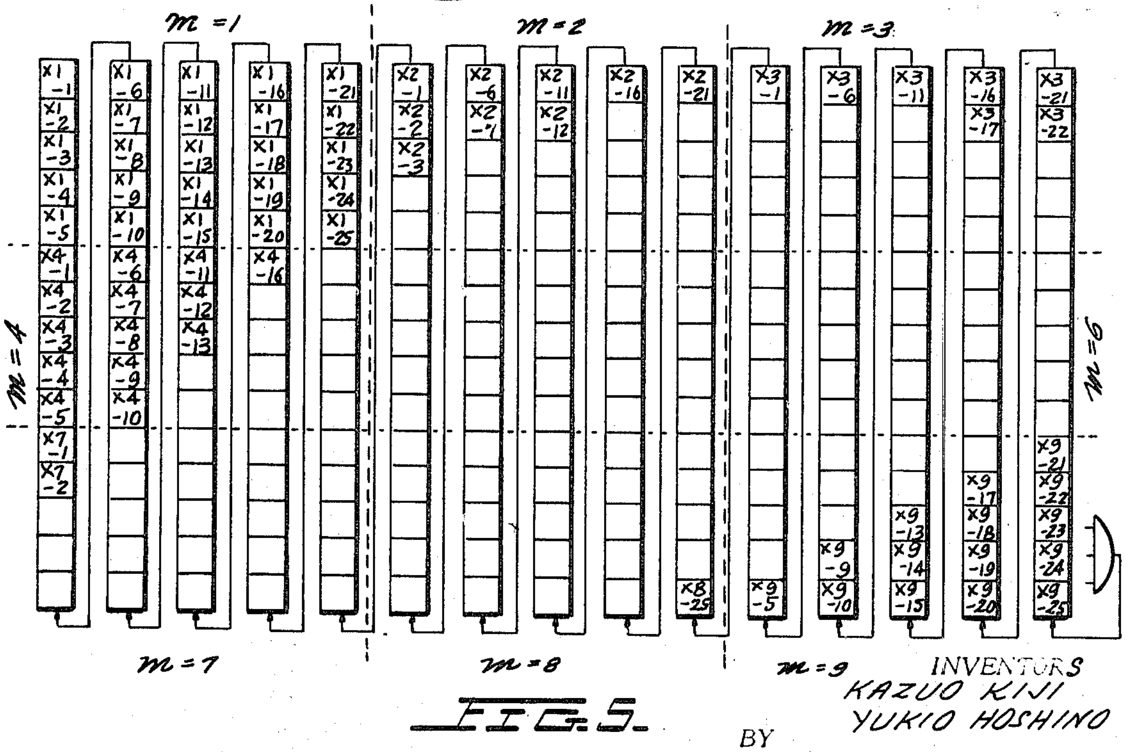

FIG. 5 is a block diagram exemplifying the descriptive notation adopted for a large number of memory cells of which a typical spot-features storing shift register is composed.

Figure 6:
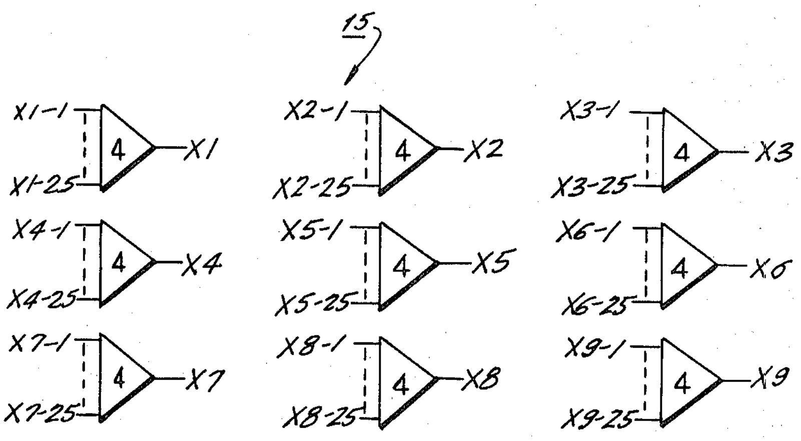
Figure 7:
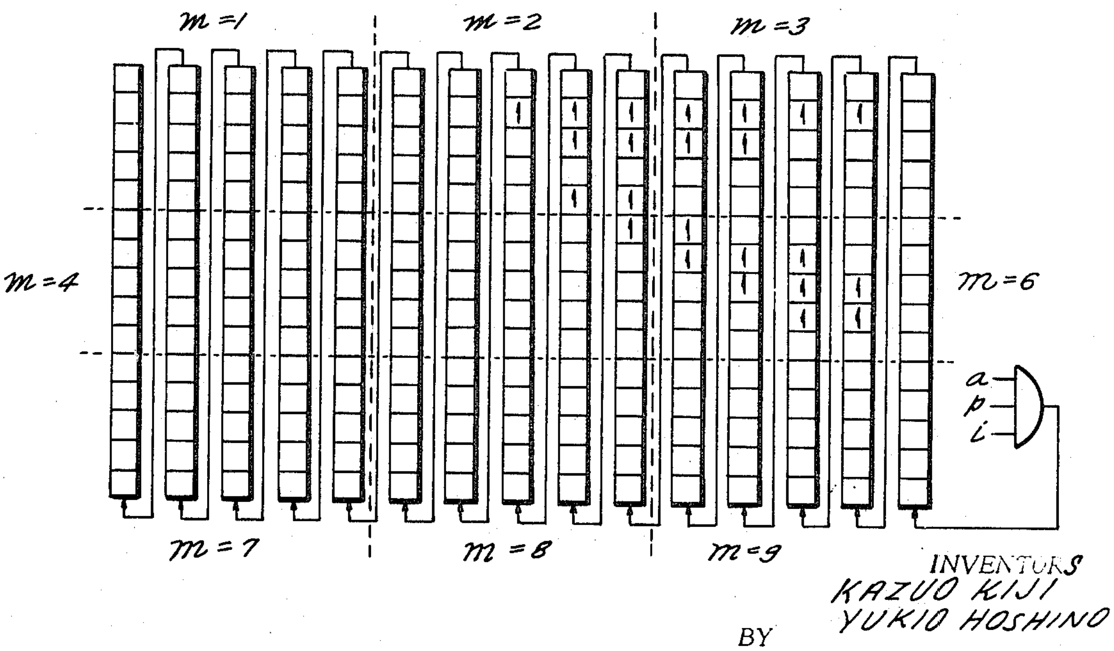
Figure 9:
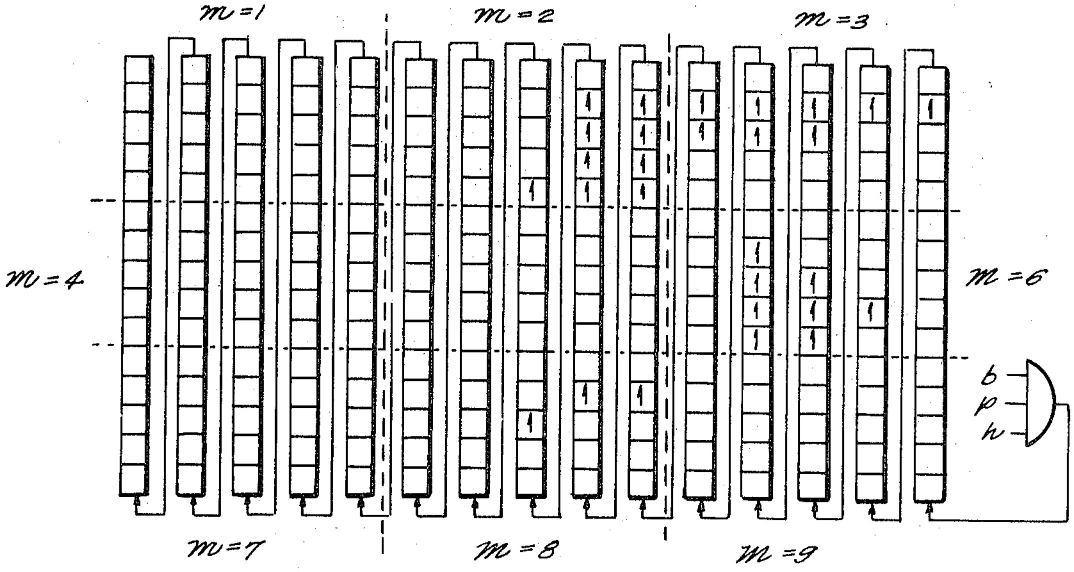
Figure 8:
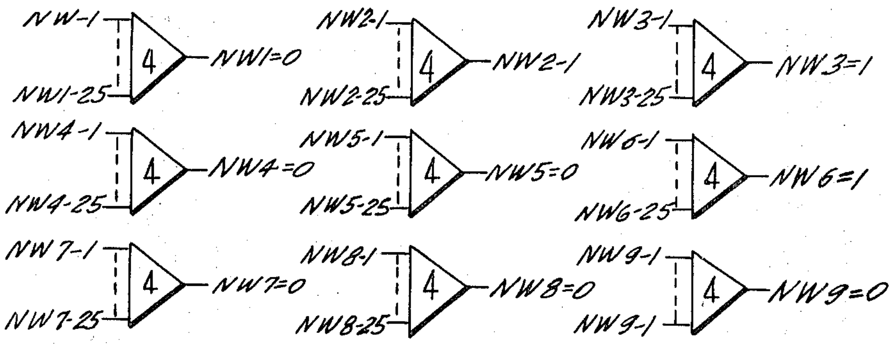

FIG. 6 is a logical block diagram showing a set of threshold logic gates employed with the spot-features storing shift register of FIG. 5.

FIGS. 7, 9, 11 and 13 are block diagrams illustrating respectively, the represented spot-features patterns NW, N, NE and E for numeral "3" in the spot-features storing shift registers.

FIGS. 8, 10, 12 and 14 are logical block diagrams schematically illustrating the outputs of the four sets of threshold logic circuits for the spot-features patterns as illustrated in FIGS. 7, 9, 11 and 13, respectively.

FIGS. 15*a*–15*d* are plan views illustrating digitized patterns of the matrix for four different styles of the numeral "3."

Figure 16:
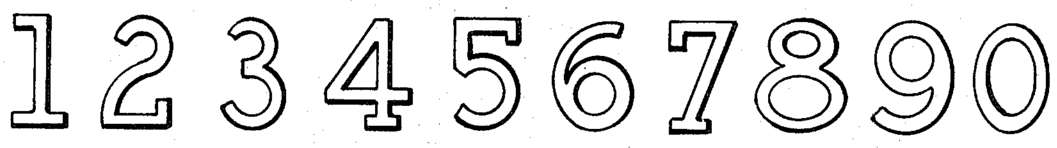
Figure 17:
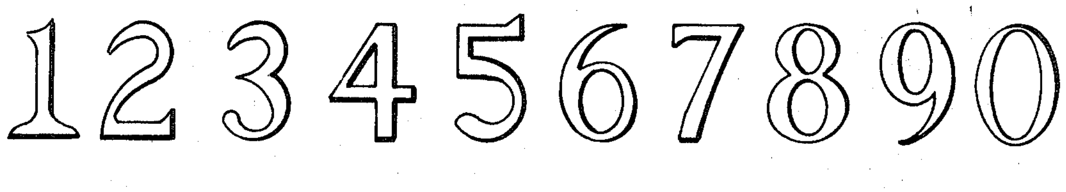
Figure 18A:
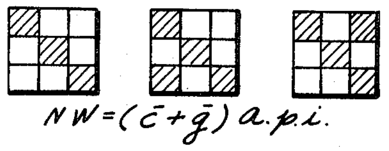
Figure 18B:
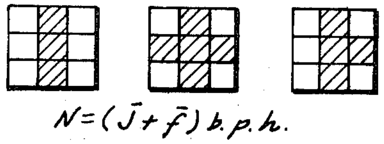
Figure 18C:
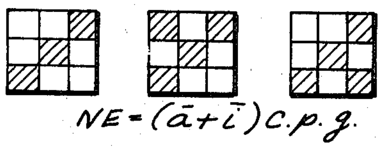
Figure 18D:
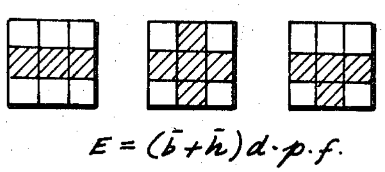

FIGS. 16 and 17 illustrate arabic numerals of two different fonts useful in describing the capability of reliable recognition of multi-font numerals by the character recognition apparatus of the instant invention.

FIGS. 18*a*–18*d* show a plurality of truth tables to illustrate respectively other Boolean algebra equations and typical matrix patterns which satisfy these Boolean algebra equations.

FIG. 19 is a truth table arranged in terms of block features (as will be fully detailed in the specification) for recognizing numeral "3" in any one of the four manners shown in FIGS. 15*a*–15*d*, respectively.

Figure 20:
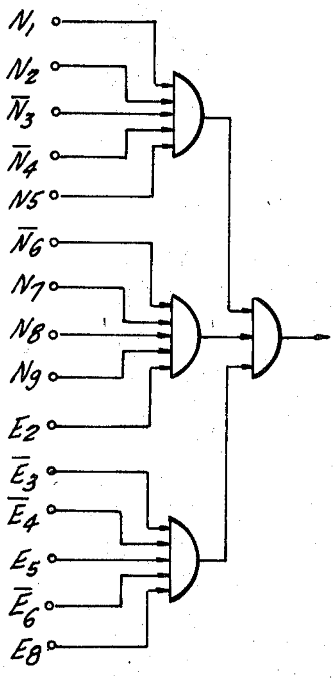

FIG. 20 is a recognition logic circuit for indicating the presence of an arabic numeral "1."

Figure 1:
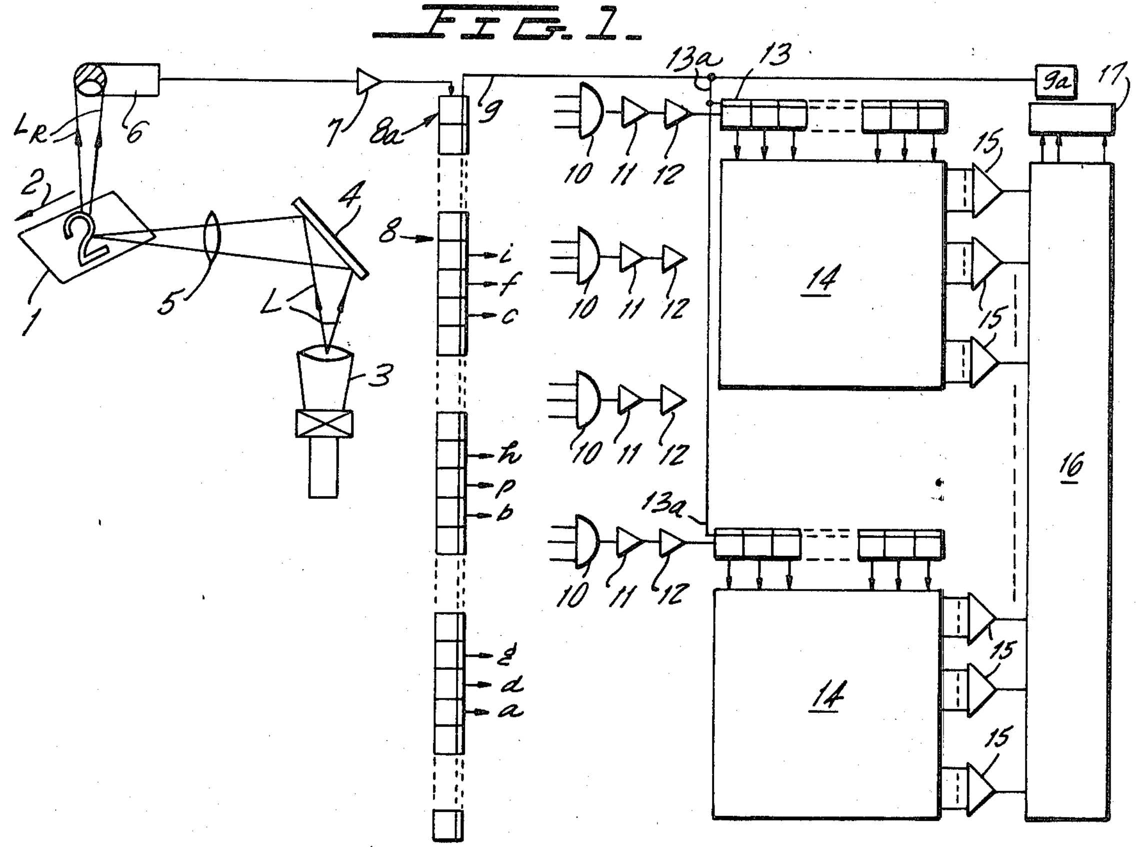
FIG. 1 is a schematic block diagram of an entire character recognition apparatus designed in accordance with the principles of the instant invention.

Referring now to the drawings, FIG. 1 shows a character-features scanning device for reading a document, 1, on which at least one numeral, for example, the numeral "2" is imprinted. The document 1 is moved in the direction shown by arrow 2 by any suitable conveying means such as, rollers, belt means and like driving means. Each of the elemental areas occupied by the numeral "2" is illuminated sequentially by means of a light beam emerging from a flying-spot scanner 3, which light beam is focussed on the elemental areas with the aid of a reflecting mirror 4 and a focussing lens system 5.

The light image from each elemental area being scanned is sensed by a photo-electric cell 6 which picks up the reflected light rays $L_R$ and converts the light rays into an electrical signal wherein the magnitude of the electrical signal is related to the intensity of the reflected light rays. The electrical signal generated by photo cell 6 is converted into a binary information signal by the saturation amplifier 7 which acts as a limiter.

The binary output from the saturation amplifier 7 is sequentially introduced into the multi-stage input shift register 8 which is comprised of a plurality of memory cells.

Accordingly, the binary information states in the individual memory cells of the input shift register 8 will be in binary "1" in scanning a black spot in the character and will be in binary "0" state in scanning a white spot. It should be understood that the binary "1" and "0" states may be reversed, depending only upon the needs of the user but the selection made herein being only for the purposes of describing one exemplary embodiment.

The stored binary information is shifted downwardly through shift register 8 each time a shift pulse appears on the shift pulse feeder line 9 for the purpose of receiving the next binary bit of information in the topmost register stage 8*a*. The shift pulse feeder 9*a* generates shift pulses which have a repetition rate substantially in synchronism with the operating frequency of the flying spot scanner 3.

An output line is connected as illustrated to each of the nine stages *a*–*i* of register 8 wherein each output line is designed to develop a binary "1" state (or a binary "0" state) when the binary information stored in the stage to which the output line is connected is in binary "1" (or in binary "0").

The four "AND" gates 10 shown in FIG. 1 are provided for deriving the Boolean algebra products $a \cdot p \cdot i$, $b \cdot p \cdot h$, $c \cdot p \cdot g$, and $d \cdot p \cdot f$, whereby the spot features indicative of the character features at and around spot $p$ can be extracted.

Each of the amplifiers 11 are provided for the purpose of amplifying the output of each of the AND gates 10, while each of the inverters 12 are provided for the purpose of reinverting the phase of a signal which is phase-inverted by amplifier 11.

The output of each inverter 12 is applied to its corresponding spot-features storing shift register 13. The binary information stored in the spot-features storing shift register 13 is shifted in sequential fashion from the left toward the right in the illustration each time a shift pulse from shift pulse feeder 9 appears at the shift pulse input 13*a* of each spot-features storing shift register 13.

The spot-features storing shift register 13 is connected to the corresponding nine threshold logic circuits 15 by the intervening wiring means 14 illustrated in block form in FIG. 1 for purposes of simplicity.

Each of the threshold logic circuits 15 is provided for the purpose of counting the number of spot features appearing in a particular block of the area covered by the character in order to determine if the counted number exceeds a predetermined number or threshold value. The binary output of the threshold logic circuits 15 will be either binary "1" or "0" in accordance with whether the counted number of spot features is more (i.e., equal to or greater than), or less than the prescribed threshold value "4." The threshold value taken for the embodiment is 4 in the present example, but this number has been selected simply for purposes of describing the exemplary embodiment and any other value may be taken depending upon the individual circumstances.

All of the binary outputs of the threshold logic circuits 15 are simultaneously applied to the recognition logic circuit 16 shown in block diagram form in FIG. 1. The recognition logic circuit 16 is designed to receive the outputs of the threshold logic circuits 15 in simultaneous or parallel fashion and is wired so as to be capable of determining bythe logic circuits incorporated therein whether or not the outputs can match the prearranged 36-bit features (which block features will be detailed subsequently) of a reference character.

Accordingly, if the outputs of the threshold logic circuits obtained by scanning a character are recognized as meeting the predetermined Boolean algebra equations, the reference character that has met the equations is transmitted to the output terminals of the recognition logic circuit 16 and through output device 17 which produces an electrical representative of the character being recognized.

A detailed description of the individual subassemblies of the character recognition apparatus shown in FIG. 1 will now be considered.

The scanning device is comprised of reflecting mirror 4, magnifying lens assembly 5, flying-spot scanner 3, photo-cell 6, and an amplifier 7. These elements scan the area covered by a character to be recognized so as to develop electrical signals corresponding to a two-dimensional array of 15 x 15 elemental areas or spots in a discrete and sequential manner. Thus the binary information "0" and "1" will be developed by scanning a white and a black spot respectively.

Figure 2:
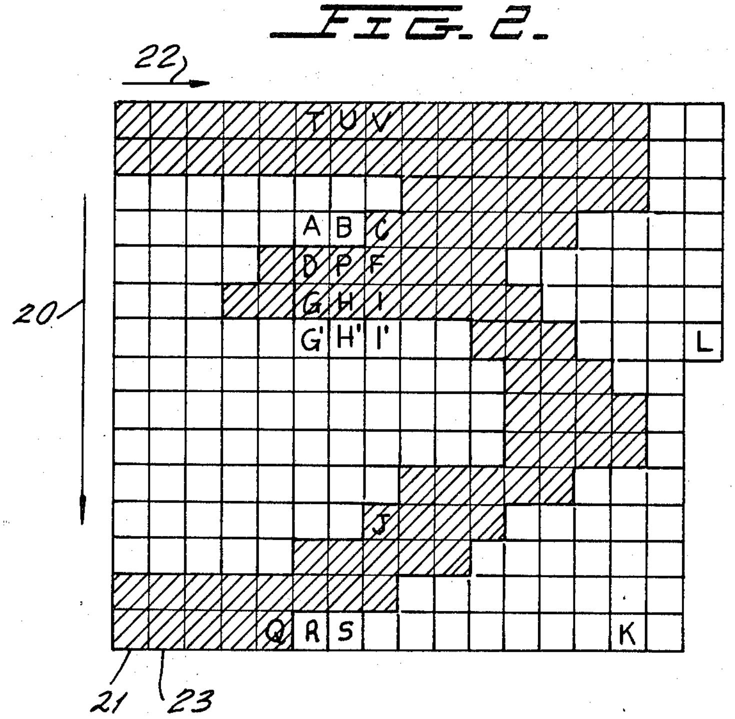
FIG. 2 shows a hypothetical matrix pattern illustrating a concept of how the area covered by a character, in this case numeral "3," is subdivided into a two-dimensional array of small black and white elemental areas or spots when the character is scanned photo-electrically.

FIG. 2 illustrates by way of example the pattern area divided into a 15 x 15 array of black (shaded area) or white spots to quantize the visual impression of the arabic numeral "3."

Figure 3:
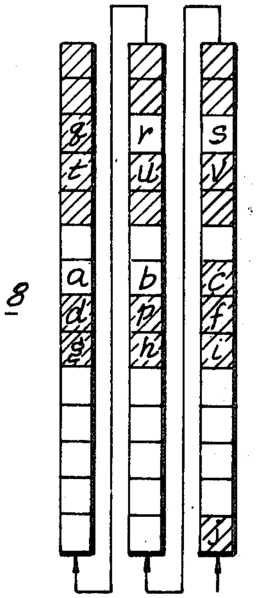
FIG. 3 is a schematic representation of a particular state of the input shift register employed in the apparatus of FIG. 1, as the numeral "3" is being scanned.

The input shift register is comprised of 45 memory cells, or stages, in accordance with one preferred embodiment so as to constitute a 3 x 15 matrix. The output signals from the scanning device are introduced into the register in first stage $j$ as shown in FIG. 3 wherein the register 8 is comprised of 3 15-stage registers with the last (i.e., topmost) stage of the right-hand registers being coupled to the first (i.e. bottomost) stage of the left-hand shift registers. The manner in which the binary information is stored in the register in scanning spot J, as shown in FIG. 2, is schematically illustrated in FIG. 3.

The binary signals corresponding to the elemental areas A, B, C, D, P, F, G, H and I are respectively stored in stages $a$, $b$, $c$, $d$, $p$, $f$, $g$, $h$, and $i$ as is illustrated in FIG. 3.

The scanning operation relative to the array shown in FIG. 2 is such that the flying spot scanner moves downwardly as shown by arrow 20 until the first column 21 of elemental areas has been scanned. The scanner then moves to the right as shown by arrow 22 so as to initiate scanning downwardly as shown by arrow 20 of the next righthandmost column 23. Scanning of the remaining columns occurs in a like manner. While the arrangement of FIG. 2 shows a scanning of a full column before moving to the next column, it should be understood that scanning could occur column-by-column from right to left and likewise can occur by performing a scanning operation on a row-by-row basis, either from right to left or left to right with the final choice being dependent only upon the needs of the user.

Assuming that the spot designated Q has been scanned, the flying spot scanner operates so as to scan the spot T at the top of the adjacent right-hand most column of FIG. 2. Therefore the binary information from spot Q and that from spot T may be stored in the two adjacent stages $q$ and $t$ in the register of FIG. 3. In a like manner, the binary value for the spots R and U or the spots S and V will be stored in adjacent stages of the three stage memory.

As soon as the binary states are caused to shift respectively by one stage, the binary states corresponding to the spots D, P, F, G, H, I, G′, H′, and I′ are stored respectively in the stages $a$, $b$, $c$, $d$, $p$, $f$, $g$ $h$, and $i$.

The term "spot features" is defined as follows:

The spot P is said to have spot features NW, N, NE, and E respectively, if the spot P shares with the adjacent spots A, B, C, D, F, G, H, and I in conditions NW, N, NE, and E as is illustrated in FIG. 4*a*.

Detection means must now be provided to determine whether or not the spot P, for example, is provided with some or all of the spot features NW, N, NE, and E. This is accomplished by detecting the output signals from the stages $a$, $b$, $c$, $d$, $p$, $f$, $g$, $h$, and $i$ by the use of the AND gates which are shown in FIG. 4*b*, which AND gates are also illustrated in FIG. 1.

Since the binary signals corresponding to the nine spots whose center spot is P, have been stored in stages $a$, $b$, $c$, $d$, $p$, $f$, $g$, $h$, and $i$, respectively, spot P will have spot feature NW provided in three outputs from stages $a$, $p$, and $i$, which three stages will all be in the binary "1" state.

In accordance with the embodiments shown in FIGS. 2 and 3, the binary information stored in each of the stages $p$ and $i$ is binary "1," whereas that stored in stage $a$ is binary "0." Therefore the Boolean product, or output from the AND gate for detecting spot feature NW, namely, the AND gate 10*a*, is equal to zero. This signifies that spot P does not have the spot feature NW as will be apparent from FIG. 2 in that the spot A is white (i.e., unshaded).

Whether or not P has the spot feature NW may be determined by evaluating the Boolean product as yielding a binary "1" or binary "0" as follows:

$$NW=a\cdot p\cdot i \qquad (1)$$

From a consideration of the above Boolean algebra equation NW equals "1" only when all three of the quantities $a$, $p$ and $i$ equal "1." If any of the three values $a$, $p$, or $i$ equals "0" then NW equals "0." In a like manner, whether or not spot features N, NE, and E are provided can be determined by evaluating the following Boolean products, respectively:

$$N=b\cdot p\cdot h \qquad (2)$$
$$NE=c\cdot p\cdot g \qquad (3)$$
$$E=d\cdot p\cdot f \qquad (4)$$

From the above it can clearly be seen that four different types of spot features can be detected by the AND gates 10*a*–10*d* shown in FIG. 4*b*, which algebraically are represented by the Equations 1 through 4 respectively.

For spot P shown in FIG. 2 the stored binary information will be as follows:

$$a=b=\text{"0"}$$
$$c=d=p=f=g=i=\text{"1"}$$

Therefore $$NW=a\cdot p\cdot i=0\cdot 1\cdot 1=0$$
$$n=b\cdot p\cdot h=0\cdot 1\cdot 1=0$$
$$NE=c\cdot p\cdot g=1\cdot 1\cdot 1=1$$
$$E=d\cdot p\cdot f=1\cdot 1\cdot 1=1$$

The above equations, together with their computations indicate that there are only two spot features, namely, spot features NE and E at spot P and the AND gates NW, N, NE, and E develop the binary outputs "0," "0," "1," and "1," respectively.

Thus the binary information signals corresponding to the individual spots are introduced into the input shift register in sequential order and, upon the arrival of the signals at stage $p$, the presence or absence of the four spot features for each spot can be determined sequentially by the above mentioned Boolean operations.

The spot-features detection system of the instant invention may be said to operate on the basis of determining whether three consecutive black squares of spots centered at P at any inclination are present. Another way of considering the presence of such three consecutive squares is as follows:

The NW feature of FIG. 4*a* indicates that three diagonally aligned spots with P as the center are aligned in a northwest to southeast fashion. This alignment can be abbreviated as a NW feature; the N spot feature indicates that three consecutive spots, whose center spot is P, are aligned in a north-south fashion, which feature may be abbreviated as a N feature; the spot feature NE indicates that three consecutive spots, whose center spot is P, are aligned in a north-east to south-west fashion, which can be abbreviated as the feature NE; and in a like manner the final feature E indicates three consecutive spots whose center spot is P, are arranged in an east to west fashion, which can be abbreviated as a E feature. Even if square P is found to be black (i.e., shaded) none of the features will be present unless squares at opposite sides of square P are both black. Obviously, if square P is white (i.e., unshaded) then none of the four features will be present.

A description of the method of abstracting the "block features" necessary for character recognition from the spot features that have been extracted will now be considered, as well as a showing that the abstraction of "block features" leads to an amount of "block features" which are much fewer in number than the total number of spot features, which in the case of the 15 x 15 array of FIG. 2 lead to four times 225 or 900 spot features.

The spot features for each of the spots or blocks of the 15 x 15 array which are sequentially fed into register 8, as shown in FIG. 1, are coupled to selected inputs of the AND gates 10 for detection of the presence or absence of these spot features. The presence or absences indicated at the output of each of the AND gates by either a binary "1" or binary "0" state, these outputs are impressed through the amplifier and inverter circuits 11 and 12 respectively, into the four spot-features storing shift registers 13, which are further schematically represented in FIGS. 7, 9, 11 and 13, each of which shift registers are comprised of 225 memory cells, or stages, arranged in a 15 x 15 matrix.

The individual stages illustrated in each of the FIGS. 7, 9, 11 and 13 correspond to the 225 spots in the matrix of FIG. 2. The numeral "1" in FIGS. 7, 9, 11 and 13 indicates a spot feature is present at the corresponding spot, while the numeral "0" (denoted by a blank for simplicity) indicates a spot feature is absent at the corresponding spot.

FIGS. 7, 9, 11 and 13 illustrate the binary information stored in the spot-features storing shift registers respectively, at the moment the scanning of spot L of FIG. 2 has been completed, or at the moment the spot features of spot K have been detected.

Let it now be assumed that the same descriptive notation as is shown in FIG. 5 is assigned to the registers of FIGS. 7, 9, 11 and 13 is denoted by the symbol $X_{m-n}$, where Z represents any of the features NW, N, NE, and E; subscript *m* represents any numeral 1 through 9, which is assigned to each of the nine blocks bounded by the dotted lines as shown in FIG. 5. All of the blocks *m* are shown in FIG. 5, with the exception of the middle block *m*=5 so as to avoid any confusion of interpretation with the stages (i.e., memory cells) of block *m*=5; subscript *n* represents any one of the numerals 1–25 which are assigned to the 25 stages or memory cells in each of the nine blocks. For example, considering the block *n*=1, it will be noted that the first column in this block is indicated by the numbers 12345, the second column of the block is indicated by the numerals 678910, and so forth. More specifically, notation for all individual pages of the register NW is as follows:

$$NW_{1-1}, NW_{1-2} \ldots NW_{1-25};$$
$$NW_{2-1}, NW_{2-2} \ldots NW_{2-25};$$
$$* \quad * \quad * \quad * \quad *$$
$$NW_{9-1}, NW_{9-2} \ldots NW_{9-25}$$

The output lines from the individual stages $X_{m-1}$, $X_{m-2} \ldots X_{m-25}$ are connected to the input terminals of the threshold logic circuitry 15 as shown in FIGS. 1 and 6.

Summarizing briefly, four spot feature registers as depicted in FIGS. 7, 9, 11 and 13 respectively, are provided for detecting the spot features NW, N, NE and E. The presence or absence of a particular spot feature is indicated by the binary "1" or the binary "0" states respectively. Each of the spot feature registers are then divided into nine groups as is shown in FIG. 5, for example, each group containing 25 stages or memory cells. The total number of spot features are then detected by the logic circuitry shown in FIGS. 1 and 6, for example. In the case of FIG. 6, there are nine logic circuits X1–X9 respectively, for each of the nine blocks into which its associated spot features register has been divided. The logic circuits X1–X9 of FIG. 6 are threshold type circuits which yield a binary "1" output if a predetermined number of spot features is achieved or surpassed. Conversely, if the predetermined number of spot features is not achieved the output of each of the registers X1–X9 will be binary "0." For example, all of the threshold logic circuits of FIG. 6 are arranged to have a threshold level of 4. The threshold logic circuits may be any suitable analog type summing circuit for summing the 25 spot features of a block to yield an analog output voltage which will either be less than, equal to, or greater than the threshold level. This voltage is then applied to a threshold gate for the purpose of determining whether the threshold level has been achieved. The same symbol $X_m$ will be used to indicate the output of a threshold logic circuit. Thus $X_m=1$ indicates that the threshold level has been achieved, while $X_m=0$ indicates that the threshold level has not been achieved.

Thus the term "block features," or the character features in a particular block, may be defined as follows:

If the output of the threshold logic circuit $X_m$="1," there is a block feature X in block *m*, whereas if the output of the threshold logic circuit $X_m$="0," then no block feature X appears in block *m*.

Figure 10:
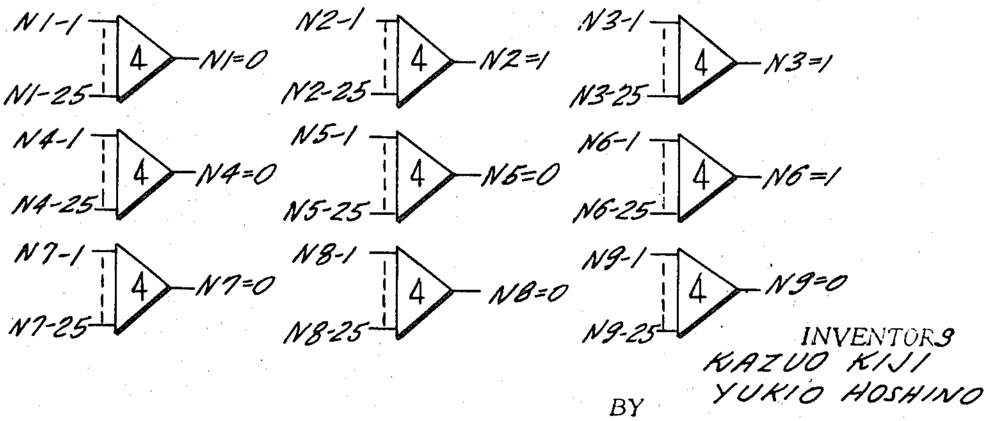
Figure 11:
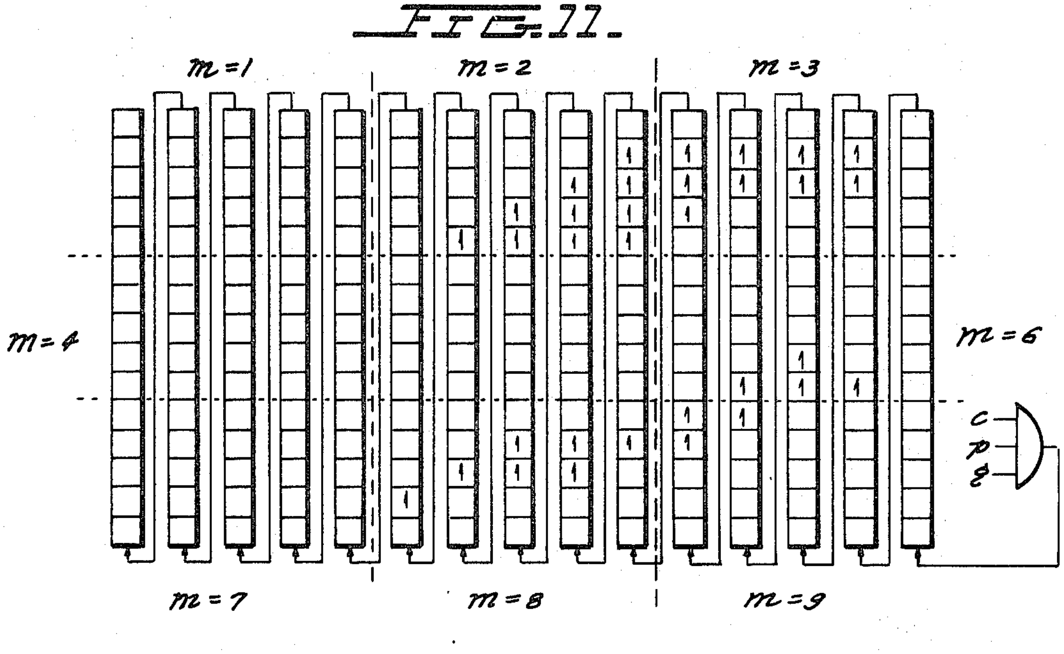
Figure 12:
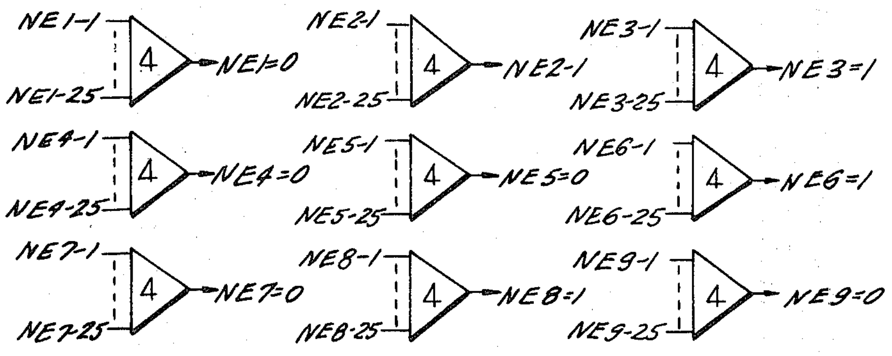
Figure 14:
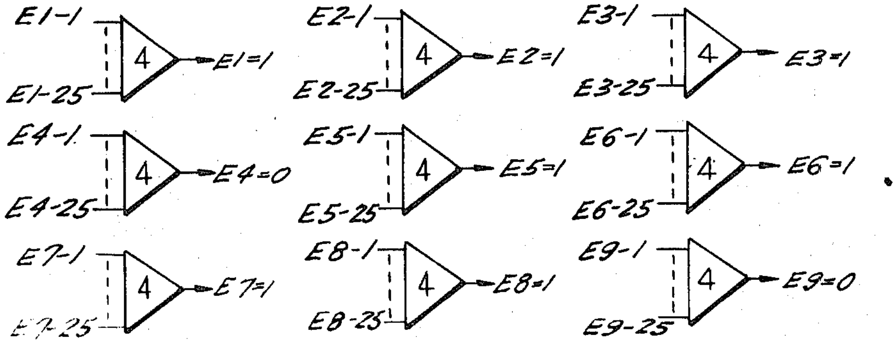

The outputs of the threshold logic circuits $X_m$ will be as shown in FIGS. 8, 10, 12 and 14 respectively, when the binary information states for the numeral "3" shown in FIG. 2 are stored in the registers in the manner illustrated in FIGS. 7, 9, 11 and 13, which store the spot features NW, N, NE, and E respectively. As one example, consider the top right-hand most block *m*=3 of the shift register shown in FIG. 9. It can be seen that eight of the 25 stages in block *N*=3 are in binary "1" state, while the remaining 17 stages are in binary "0" state. Considering FIG. 10, the threshold logic circuit associated with the top right-hand most block has a threshold level of 4. Since there are eight binary "1" states in block *N*=3 the threshold level will be surpassed yielding an output $N_3=1$ as is shown in FIG. 10.

Since the threshold logic circuitry 15 simply counts the number of binary "1" states in each block to determine whether it exceeds a predetermined threshold value, it is possible to employ an ordinary digital counter for the threshold logic circuitry combined with means for detecting whether or not the level is exceeded, in lieu of the threshold logic circuitry previously described. Thus the threshold logic circuitry may be comprised of a five stage digital counter which is satisfactory for drawing a count of 32. Selected outputs of the five stages are then coupled to suitable gating circuits to provide a binary "1" output whenever the threshold level or count has been achieved. Such circuitry is well known to the art and will not be detailed herein for purposes of simplicity.

FIGS. 15*a*–15*d* show four different matrix patterns which are developed by scanning a numeral "3" which has been imprinted upon a document in four different styles. The arrays developed as a result of scanning four different styles of the arabic numeral "3" will clearly demonstrate that the syetem of the instant invention is capable of recognizing all styles or fonts of letters and reliably providing an indication of the fact that the figure being scanned is arabic numeral "3" despite small changes in styling of the letter so long as the same Boolean equation obtained from the table in FIG. 19 is employed. These desirable results are obtained in the following manner:

(It should be noted that the pattern of FIG.15*a* is an exact replica of the pattern shown in FIG. 2.)

Referring to the tables shown in FIG. 19, the first column therein indicates the threshold levels obtained for each of the patterns 15*a*–15*d*. The block numbers 1–9 across the topmost row of FIG. 19 indicate the block numbers *m* corresponding to the nine blocks of which each character area is comprised. The notations NW*m*, N*m*, NE*m*, and E*m* in the second row of FIG. 19 indicate the outputs for each of the threshold logic circuits of the associated block *m*. It can be seen that the binary "1's" or "0's" from the threshold logic circuits for the matrix patterns of FIGS. 15*a*–15*d* are indicated at the intersections of the rows **15*a*–15*d*** for the matrix patterns and the columns X*m* and the threshold logic circuits.

Considering the bottom most row of FIG. 19, the numerals "1" and "0" and the blank spaces indicate the following:

If all of the four styles of the number "3" share a particular block feature in block *m* (i.e., they are all "1's" or "0's"), a binary "1" or a binary "0" is then entered into the appropriate block of the bottom row. If the features are mixed, i.e., partly binary "1's" and partly binary "0's" the particular block associated with the mixed features of a column are left as a blank space.

For example, considering block 1 of FIG. 19, all of the four styles of the arabic numeral "3" share block feature E (in other words, this feature is a significant feature), but all other significant block features are not present. Thus, the columns NW1, N1 and NE1 receive a "0" in the bottom row, while column E1 receives a "1" in the bottom row. In block $M=2$ all of the four pattern styles share the significant block feature E2, while all other significant block features are mixed, partly "1" and partly "0" so that columns NW2, N2, and NE2 are left with blank spaces in the bottom row while column E2 is provided with a "1" in the bottom row. Considering block $M=6$, all of the features are mixed so that all blank spaces are provided in the bottommost row. However, it should be noted as each of the columns NW6, N6, NE6 and E6 have at least one block feature (i.e., have at least one binary "1" in their respective columns). This signifies that the character strokes are invariably present in which the number "3" is written.

The fact that the identical stroke feature is not shared by all four styles while at the same time each of the stroke features is present in at least one of the embodiments, can be detected through the use of a logical OR operation ($NW6+N6+NE6=E6$). Let the complement of the output X$m$ from a threshold logic circuit be denoted by $\overline{X}m$. Then the Boolean equation for recognizing numeral "3" of FIGS. 15$a$–15$d$ can be derived by reference to the table of FIG. 19 as follows:

$$\text{“3”}=(\overline{NW1}\cdot\overline{N1}\cdot\overline{NE4}\cdot E1)E2\cdot E3(\overline{NW4}\cdot\overline{N4}\cdot\overline{NE4}\cdot\overline{E4})\cdot(\overline{NW5}\cdot\overline{N5}\cdot\overline{NE5}\cdot\overline{E5})(NW6+N6+NE6+E6).(\overline{NW7}\cdot\overline{N7}\cdot\overline{NE7})(\overline{NW8}\cdot\overline{N8}\cdot E8)(\overline{NW9}\ \overline{E9})$$

The recognition matrix 16 of FIG. 1 can then be constructed of a plurality of suitable AND gates and OR gates so as to satisfy the above Boolean equation. Of course, as is well known in Boolean algebra any appropriate methods may be employed for the purpose of reducing the above Boolean algebra equation to its simplest form for the purpose of simplifying the logic of recognition matrix 16.

The Boolean equations containing N and E only for recognizing numerals printed in two different fonts as shown in FIGS. 16 and 17 are as follows:

$$\text{“1”}=N1(N2\cdot E2)\cdot(\overline{N3}\cdot\overline{E3})(\overline{N4}\cdot\overline{E4})(N5\cdot E5)\cdot(\overline{N6}\cdot\overline{E6})\cdot N7\cdot(N8\cdot E8)\cdot N9$$

$$\text{“2”}=(\overline{N2}\cdot E2)\cdot N3\cdot(\overline{N5}\cdot\overline{E5})\cdot(\overline{N5}\cdot E5)\cdot E7\cdot(\overline{N8}\cdot E8)\cdot(N9\cdot E9)$$

$$\text{“3”}=\overline{N1}\cdot(\overline{N2}\cdot E2)\cdot N3\cdot(\overline{N4}\cdot\overline{E4})\cdot E5\cdot\overline{N7}\cdot(\overline{N8}\cdot E8)\cdot\overline{E9}$$

$$\text{“4”}=(\overline{N1}\cdot\overline{E1})\cdot(N2\cdot E2)\cdot N3\cdot E4\cdot(N5\cdot E5)\cdot(N6\cdot E6)\cdot\overline{N7}\cdot(N8\cdot E8)\cdot(N9\cdot E9)$$

$$\text{“5”}=(N1\cdot E1)(\overline{N2}\cdot E2)\cdot E4\cdot(\overline{N5}\cdot E5)\cdot\overline{E6}\cdot(\overline{N7}\cdot E7)\cdot(\overline{N8}\cdot E8)\cdot(\overline{N9}\cdot\overline{E9})$$

$$\text{“6”}=(\overline{N2}\cdot E2)\cdot(N3\cdot E3)\cdot(N4\cdot E4)\cdot(\overline{N5}\cdot E5)(N6\cdot E6)\cdot(N7\cdot E7)\cdot(\overline{N8}\cdot E8)\cdot(N9\cdot E9)$$

$$\text{“7”}=E1\cdot(\overline{N2}\cdot E2)\cdot N3\cdot(\overline{N4}\cdot\overline{E4})\cdot\overline{E5}\cdot(\overline{N6}\cdot\overline{E6})\cdot\overline{N8}\cdot(\overline{N9}\cdot\overline{E9})$$

$$\text{“8”}=(N1\cdot E1)\cdot\overline{N2}\cdot(N3\cdot E3)\cdot(N4\cdot E4)(\overline{N5}\cdot E5)\cdot(N6\cdot E6)\cdot(N7\cdot E7)\cdot(\overline{N8}\cdot E8)\cdot N9$$

$$\text{“9”}=(N1\cdot E1)\cdot(\overline{N2}\cdot E2)\cdot N3\cdot(N4\cdot E4)(\overline{N5}\cdot E5)\cdot(N6\cdot E6)\cdot\overline{N8}\cdot(\overline{N9}\cdot\overline{E9})$$

$$\text{“0”}=(N1\cdot E1)\cdot(\overline{N2}\cdot E2)\cdot(N3\cdot E3)\cdot(N4\cdot\overline{E4})\cdot(\overline{N5}\cdot\overline{E5})\cdot N6\cdot\overline{E7}\cdot(\overline{N8}\cdot E8)\cdot(N9\cdot E9)$$

Obviously the accuracy for recognition of the arabic numerals zero through nine can be greatly enhanced by including the block features NW and NE together with the block features N and E in the same manner as has been done for the arabic numeral "3" above, which Boolean algebra equation includes all four features N, E, NW and NE. The Boolean alegra equations in which all four features are employed can likewise be simplified in accordance with appropriate Boolean algebra practice in order to thereby simplify the logical gates necessary for constructing the recognition matrix. FIG. 20 shows one possible arrangement for the recognition circuitry utilized to indicate the presence of arabic numeral "1." It can be seen from FIG. 20, four logical AND gates are employed to produce a suitable output from the inputs N1–N9 and E1–E9. Of course the complement of any of the inputs N and E may be generated through use of an inverter logic circuit. However FIG. 20 assumes that the complements have already been generated before the appropriate signals are impressed upon the AND gates as shown in FIG. 20. It should be understood that the number of AND gates may be reduced by utilization of AND gates having a greater number of inputs than the five inputs shown for the AND gates of FIG. 20. The arrangement of FIG. 20 is by no means depicted as the most simple logical circuit and it should be understood that the logical circuitry may be simplified by reducing the Boolean algebra equation for identifying the arabic numeral "1" in accordance with Boolean algebra practice.

If the entire recognition matrix 16 of FIG. 1 is constructed in the manner as set forth by the above ten Boolean algebra equations, the outputs of the threshold logic circuits will invariably meet one of the Boolean algebra equations at some instant regardless of which front is scanned, and at this instant, a numeral can be identified.

The saturation amplifier 7, inverter 11, "AND" gate 10, inverter 12, and threshold logic circuits 15 may all employ conventional practices well known in the present state of the art and for this reason, detailed description of these circuits is omitted for purposes of brevity.

It will be obvious from the foregoing description that no particular circuit for a normalizing process for each character to be recognized is required as a preliminary step for recognition; character features can be detected with a minimum number of AND gates; and characters can easily be recognized by suitable combination of the outputs of the threshold logic circuits. In these respects, the simplicity of the instant invention and the novel use of a spot features technique yields a scanning apparatus having an extremely high degree of practical utility.

The above detailed recognition method is employed to detect whether or not there exists some or all of the block features of the four different types at the stroke of a character in each of the nine blocks covering the entire area in which the character is written, which method employs a means for detecting whether or not spot features of the four types as are shown in FIG. 4, are present for the spot P being scanned, with the spot P being the center spot of a group of nine spots as is clearly indicated in FIG. 4$a$. In the case of the above detailed method, each block or spot tends to have all of the four block features in cases where the character strokes have appreciable thickness. Therefore, the number of effective block features for character recognition will be decreased unless the method is suitably modified. In the above mentioned case, the provision of a thinning operation and the additional circuitry for performance of the thinning operation will cause the apparatus to become bulky and more complex. This difficulty encountered with the detecting method may be overcome by detecting the stroke edge or demarcation line between the black and white parts of a character for each block.

A modification of the detection method will now be outlined as an alternative embodiment adapted for recognition of thick stroke characters, which alternative embodiment is based on the detection of block features at the character edges in each block of the nine blocks making up the area in which a character for reading is imprinted.

FIGS. 18$a$–18$d$ illustrate four different sets of matrix patterns and the corresponding Boolean algebra equations for abstracting the spot features. It should be noted that the symbols $a, b, c, \ldots i$ and $p$ are assigned to each block within the matrix pattern in the same manner as that shown in FIG. 4$a$.

In the Boolean algebra equations appearing in FIGS. 18*a*–18*d*, *a, b, c, d, p, f, g, h,* and *i* and $\bar{a}, \bar{b}, \bar{c}, \bar{d}, \bar{f}, \bar{g}$ and $\bar{h}$ denote respectively, the outputs from individual stages of the input shift register and their complements, while the signs "+" and "·" stand for logical "OR" and logical "AND" operations.

The Boolean equations of FIGS. 18*a*–18*d* have the following significance.

If two sets of the three consecutive black blocks are orthogonal to one another, the spot features will never be simultaneously binary "1." In other words, the simultaneous existence of $N=1$ and $E=1$; or $NW=1$ and $NE=1$, are incompatible with each other and therefore cannot exist simultaneously.

Secondly, in recognition of characters formed of thick strokes, the 3 x 3 matrix for spot-features detection may at times be entirely contained within the stroke thickness. In such cases, all spot features will be zero. In other words, the possibility that any one or more of the NW, N, NE and E spot features are binary "1" is exclusively restricted to the demarcation area between a black and white boundary portiton of a character. This factor clearly demonstrates that the modified detection method completely dispenses with the need for a thinning process and hence with the need for circuitry to carry out such a thinning process.

The alternative embodiment of the instant invention may be simply realized by replacing the "AND" gates 10 shown in FIG. 1 with logical gating circuits which satisfy the Boolean equations of FIGS. 18*a*–18*d* respectively. In this manner the logic circuits permit the stroke inclinations (horizontal, vertical and diagonal) in individual blocks to be simultaneously abstracted without resorting to a thinning operation.

Whereas the embodiments of the instant invention have been described as being employed for recognition of characters of either printed or typewritten form which are perfectly aligned on the document being read, it should be understood that misregistration due to slight misalignment or print format variation in the vertical direction may arise. These adverse conditions may be compensated for by scanning an area which is slightly larger than the regular character area. For this purpose, some additional stages may be added, as required, to each of the input shift registers shown in FIG. 2 and to the spot-features storing shift registers shown in FIGS. 7, 9, 11 and 13 so that the array can be made to be slightly greater than a 15 x 15 array, by any amount desired for the purposes of the user.

Briefly summarizing the apparatus of the instant invention, the system as shown in FIG. 1 may be considered as being conveniently classified into the following five sections as viewed from the left to the right of the illustration:

Scanning means similar to those employed in television techniques.

An input shift register for storing and shifting the reflected light beam scanning the document sheet under control of the flying spot scanner.

A spot-features detection means.

Block-features detection means.

Final recognition output device.

The flying spot scanner scans each character to be recognized in the same manner than an electron beam scans the face of a television tube. The light beam impinges on the document surface and the amount or intensity of light reflected to the photoelectric reading means is dependent upon the blackness or whiteness of the particular spot being scanned at any given instant. The elemental or discrete positions of a scanned line are fed into the input shift register in synchronism with a shift pulse feeder line 9.

The spot features NW, NE, N, and E are then detected by the spot features detection devices which are the logical gates 10. If the spot features are present a binary "1" condition is transmitted to the associated spot feature position of the spot feature registers 13 which are four in number for the purpose of storing the spot features NW, NE, N and E respectively.

After all of the spot features have been stored in the four spot features registers 13 its threshold logic circuitry coupled to the outputs of an associated spot features register indicate whether a predetermined threshold level for each block is achieved. For example, in the top left-hand most block of the N spot features register the threshold logic circuitry indicates whether four or more of the spot features are present in the 25 blocks comprising the top left-hand most block $M=1$.

The outputs of the threshold logic circuits which are either binary "0" or binary "1" are then impressed upon the recognition logic circuits such as the recognition logic circuit shown in FIG. 20 for indicating the presence of an arabic numeral "1." The recognition logic circuits accept the outputs of the threshold logic circuits as well as their complements (in certain cases) for the purpose of determining which character is presently being scanned. This information may then be read out in any suitable electrical, electromechanical or optical fashion by feeding the output into a paper tape punch, a magnetic tape, a magnetic drum, a magnetic core memory, a Nixie tube, or any suitable output utilization means for computational, processing collating, or other purposes.

While certain embodiments of the instant invention have been described above, it should be understood that various modifications, refinements, and omissions in the circuits and operations may be made by those skilled in the art without substantially departing from the spirit of this invention. For this reason it is intended that the invention be limited not by the description given herein, but only by the appending claims.

What is claimed is:

1. A character recognition system capable of identifying characters of varying fonts as well as handwritten characters arranged along a document comprising first means generating a light beam for sequentially scanning a substantially block shaped area occupied by a character; said block shaped area being divided into a plurality of rows of elemental areas arranged in matrix fashion;

said scanning means including second means to sequentially scan the elementary areas of each row and sequentially scan each row;

third means coupled to said scanning means for converting the light beam reflected from each elementary area into binary signals representing either a dark or light surface condition in each elementary area;

a multi-stage input shift register, wherein each stage is comprised of a memory cell, for sequentially receiving binary output signals from said third means, each binary signal being stored in one of said memory cells;

a first plurality of spot-features detecting means coupled to selected memory cells of said input shift register for indicating the presence of predetermined patterns which each elementary area forms with the elementary areas contiguous to the elementary area being examined for said spot features;

a plurality of spot-features storing registers each being capable of storing one type of pattern which is peculiar to each elementary area;

each of said spot-features storing registers having a number of memory cell stages sufficient for storing a particular feature for each elementary area in an array, each of said spot-features storing registers being coupled to selected ones of said detecting means for storing said spot-features information in binary form;

a second plurality of second detection means each being coupled to a different group of stages of said spot-features storing registers; each group of stages representing a sub-section of the aforementioned block like area which contains a plurality of elementary areas arranged in matrix fashion;

each second detection means being comprised of threshold logic means for generating a signal to indicate that the total number of one type pattern within the group is at least equal to said threshold level; and for generating a complementary signal when the total number of said one type of pattern is less than said threshold value;

logical gating means coupled to selected ones of said second detection means for identifying the character whose spot-features are stored in the spot features register means;

each of said spot-features storing registers being comprised of a plurality of stages of memory cells arranged in a matrix fashion for storing a binary signal indicative of the presence or absence of a a pattern assigned to the spot-feature storing register for each of said elementary areas; each of said second detection means being comprised of fourth means for receiving binary information from a group of stages of the spot-features storing register associated with each second detection means;

fifth means for counting the total number of the particular pattern which are present in the group of stages;

and sixth threshold gate means for generating a first output when said predetermined threshold level is achieved and for generating a second complementary output when said predetermined threshold level is not achieved.

2. A character recognition system capable of identifying characters of varying fonts as well as handwritten characters arranged along a doucment comprising first means generating a light beam for sequentially scanning a substantially block shaped area occupied by a character; said block shaped area being divided into a plurality of rows of elemental areas arranged in matrix fashion;

said scanning means including second means to sequentially scan the elementary areas of each row and sequentially scan each row;

third means coupled to said scanning means for converting the light beam reflected from each elementary area into binary signals representing either a dark or light surface condition in each elementary area;

a multi-stage input shift register, wherein each stage is comprised of a memory cell, for sequentially receiving binary output signals from said third means, each binary signal being stored in one of said memory cells;

a first plurality of spot-features detecting means coupled to selected memory cells of said input shift register for indicating the presence of predetermined patterns which each elementary area forms with the elementary areas continguous to the elementary area being examined for said spot features;

a plurlity of spot-features storing registers each being capable of storing one type of pattern which is peculiar to each elementary area;

each of said spot-features storing registers having a number of memory cell stages sufficient for storing a particular feature for each elementary area in an array, each of said spot-features storing registers being coupled to selected ones of said detecting means for storing spot-features information in binary form;

a second plurality of second detection means each being coupled to a different group of stages of said spot-features storing registers; each group of stage representing a subsection of the aforementioned block like area which contains a plurality of elementary areas arranged in matrix fashion;

each second detection means being comprised of threshold logic means for generating a signal to indicate that the total number of one type pattern within the group is at least equal to said threshold level; and for generating a complementary signal when the total number of said one type of pattern is less than said threshold value;

logical gating means coupled to selected ones of said second detection means for identifying the character whose spot-features are stored in the spot-features register means; each of said second detection means being comprised of:

fourth means for receiving binary information from a group of stages of the spot-features storing register associated with each second detection means;

fifth means for counting the total number of the particular pattern which are present in the group of stages; and sixth threshold gate means for generating a first output when said predetermined threshold level is achieved and for generating a second complementary output when said predetermined threshold level is not achieved.

3. The apparatus of claim 2 wherein said logical gating means is comprised of logical circuits coupled to selected ones of said second detection means for each of said groups of patterns to generate one output signal to identify the character being scanned.

References Cited

UNITED STATES PATENTS

| | | | |
|---|---|---|---|
| 3,196,397 | 7/1965 | Goldstine et al. | 340—146.3 |
| 3,196,399 | 7/1965 | Kamentsky et al. | 340—146.3 |

MAYNARD R. WILBUR, Primary Examiner

T. J. SLOYAN, Assistant Examiner